United States Patent
Esbensen et al.

(10) Patent No.: US 11,108,550 B1
(45) Date of Patent: *Aug. 31, 2021

(54) METHOD AND SYSTEM FOR HIGHLY SECURED NETWORK COMMUNICATION USING QUANTUM TECHNOLOGIES

(71) Applicants: Daniel M. Esbensen, Hayward, CA (US); Stephen M. Omohundro, Palo Alto, CA (US)

(72) Inventors: Daniel M. Esbensen, Hayward, CA (US); Stephen M. Omohundro, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/996,869

(22) Filed: Aug. 18, 2020

Related U.S. Application Data

(63) Continuation-in-part of application No. 16/905,420, filed on Jun. 18, 2020, now Pat. No. 10,984,138.

(60) Provisional application No. 62/865,969, filed on Jun. 24, 2019.

(51) Int. Cl.
*H04L 9/08* (2006.01)
*H04L 29/06* (2006.01)
*G06N 10/00* (2019.01)

(52) U.S. Cl.
CPC .......... *H04L 9/0852* (2013.01); *G06N 10/00* (2019.01); *H04L 9/0819* (2013.01); *H04L 9/0869* (2013.01); *H04L 63/0485* (2013.01)

(58) Field of Classification Search
CPC .............................. G06N 10/00; H04L 9/0852

USPC ......................................................... 713/193
See application file for complete search history.

(56) References Cited

U.S. PATENT DOCUMENTS

| | | | |
|---|---|---|---|
| 8,099,762 B2* | 1/2012 | Valenti | H04L 9/0827 726/3 |
| 2014/0331050 A1* | 11/2014 | Armstrong | H04L 9/0819 713/171 |
| 2016/0218867 A1* | 7/2016 | Nordholt | H04L 9/0852 |
| 2019/0155959 A1* | 5/2019 | Lee | G06F 3/0643 |
| 2019/0182034 A1* | 6/2019 | McCarthy | H04L 9/14 |
| 2020/0351075 A1* | 11/2020 | Griffin | H04L 9/0637 |

OTHER PUBLICATIONS

Office Action issued in related U.S. Appl. No. 16/905,420, dated Nov. 2, 2020 (10 pgs).
Clark, Stephen, "Europe's Sentinel Satellites Generating Huge 'Big Data' Archive", Spaceflight Now, Nov. 4, 2020 (7 pages).

(Continued)

*Primary Examiner* — Anthony D Brown
(74) *Attorney, Agent, or Firm* — Hayes Soloway P.C.

(57) ABSTRACT

Systems and methods for secure network communications of data using quantum key distribution (QKD) are presented. Source data is provided. The source data is encrypted to produce encrypted data and key data corresponding to the encrypted data. Using QKD, the key data is transmitted from a first network location to a second network location. Successful transmission of the key data to the second location is verified, and upon verification, the encrypted data is transmitted from the first network location to the second network location using QKD. Successful transmission of the encrypted data to the second location is verified, and upon verification, the encrypted data is decrypted with the key data to provide a data output.

18 Claims, 12 Drawing Sheets

(56) References Cited

OTHER PUBLICATIONS

Dmitriev, Stan, "Autonomous cars will generate more than 300TB of data per year", Tuxera, Nov. 28, 2017 (5 pages), https://www.tuxera.com/blog/autonomous-cars-300-tb-of-data-per-year/.

Latacora, "Cryptographic Right Answers", Apr. 3, 2018 (9 pages), https://latacora.micro.blog/2018/04/03/cryptographic-right-answers.html.

Wikipedia, "EdDSA", (5 pages); https://en.wikipedia.org/wiki/EdDSA#Ed25519.

Wikipedia, "General Data Protection Regulation", (20 pages); https://en.wikipedia.org/wiki/General_Data_Protection_Regulation.

Wikipedia, "Health Insurance Portability and Accountability Act", (15 pages); https://en.wikipedia.org/wiki/Health_Insurance_Portability_and_Accountability_Act.

Jurvetson, Steve "How a quantum computer could break 2048-bit RSA encryption in 8 hours", MIT Technology Review, May 3 0, 2019 (9 pages); https://www.technologyreview.com/s/613596/how-a-quantum-computer-could-break-2048-bit-rsa-encryption-in-8-hours/.

Wikipedia, "One-time pad", (10 pages); https://en.wikipedia.org/wiki/One_time_pad.

Patrizio, Andy, "IDC: Expect 175 zettabytes of data worldwide by 2025", Network World, December 3, 2 018, (4 pages); https://www.networkworld.com/article/3325397/idc-expect-175-zettabytes-of-data-worldwide-by-2025.html.

Rosenberg, Barry, "DISA Seeks Encryption That Quantum Computers Can't Break", Breaking Defense, (3 pags) https://breakingdefense.com/2019/05/disa-seeks-encryption-that-quantum-computers-cant-break/.

Andy, "How many satellites Orbiting the Earth in 2019?", Jan. 16, 2019, Pixalytics, (9 pages); https://www.pixalytics.com/satellites-orbiting-earth-2019.

Shacklett, Mary, "Movie animation firm's big data challenges present lessons to learn", Big Data, Oct. 6, 2014, https://www.techrepublic.com/article/movie-animation-firms-big-data-challenges-present-lessons-to-learn/ (8 pages).

Switch Technology, "Shield Encrypts your Network Communication through eMax" (5 pages) https://switchtech.com/shield/, 2019.

* cited by examiner

METHOD AND SYSTEM FOR HIGHLY SECURED NETWORK COMMUNICATION USING QUANTUM TECHNOLOGIES

CROSS REFERENCE TO RELATED APPLICATION

This application is a continuation-in-part application of U.S. patent application Ser. No. 16/905,420, entitled, "Method and System for Providing Highly Secured Transportable Data" filed Jun. 18, 2020, which claims benefit of U.S. Provisional Application Ser. No. 62/865,969, entitled "Method and System for Providing Highly Secured Transportable Data" filed Jun. 24, 2019, the entire disclosure of which is incorporated herein by reference.

FIELD OF THE DISCLOSURE

The present disclosure is generally related to secure transport and storage of data and more particularly is related to methods and systems for highly secured network communication using quantum technologies.

BACKGROUND OF THE DISCLOSURE

Common implementations of data storage security rely on a single security key of 256 bits being applied to the data that then produces an encrypted copy of the data.

Many situations require that data be highly secured while in transit. These include, but are not limited to, high-value intellectual property like digital films, sensitive corporate and government data, health data with Health Insurance Portability and Accountability Act of 1996 (HIPAA) privacy requirements, and personal information in the European Union where General Data Protection Regulation (GDPR) compliance requires data protection. Many situations also require data to be highly secured while physically stored.

Today's cryptographic systems for securing data suffer from a number of problems. A common method for encrypted transport of data is to first use public key cryptography to transmit a symmetric cryptographic key and then to transmit the message data encrypted using symmetric cryptography with the exchanged key. The cryptography guide by Latacora describes Advanced Encryption Standard-Galois/Counter Mode (AES-GCM) as the most popular mode of symmetric encryption today and recommends the use of a 256-bit key. Latacora also recommends Networking and Cryptography library (NaCl) for asymmetric encryption based on the Curve25519 elliptic curve.

Unfortunately, the development of quantum computing, increases in hardware speed, the development of new cryptanalysis algorithms, and hardware security flaws have caused many to be concerned about the future security of the current cryptographic techniques. The new field of "post-quantum cryptography" has proposed new algorithms which are intended to be safe against cryptanalysis by quantum computers but they are unproven and not yet widely accepted. Many are also worried about the possibility of backdoors in standard algorithms which might be exposed in the future. There is no mathematical proof that either symmetric or public key encryption algorithms are actually secure. Public key cryptography, especially, is based on unproven assumptions which many question. The only known mathematically provably secure encryption technique is the "One Time Pad" (OTP), which combines the message with a random key of the same length. But current implementations of OTPs have suffered from technological difficulties making their widespread use impractical. For example, OTP key storage and distribution has traditionally been regarded as prohibitive.

Another issue of increasing importance is the insecurity of modern computer hardware. Two processes which run on the same processor can leak information about cryptographic keys between them through the processor's instruction cache. Information left in caches can also reveal supposedly secret information when speculative execution unwinds. And the "Rowhammer" and "Drammer" attacks access memory in ways that can flip bits in a key and break encryption. More and more hardware and side-channel attacks are being discovered every day. Using today's processors with the standard encryption techniques leaves the user uncertain about the security of their data.

Encryption systems which are based on a small key (e.g., Latacora's recommended 256 bits) enable attacks which discover and transmit those small number of bits to recover all of the encrypted data. The single key, once known, can be easily and quickly sent across the Internet or by other electronic means and used to decrypt massive amounts of secured data. Low data rate transmission methods like inaudible signals over a computer's speaker can even be used to transmit small keys from machines which are not connected to networks. Discovery of even a small number of bytes of key data can expose the contents of hundreds of terabytes of supposedly secured message data. In many settings, this kind of risk of exposure is unacceptable.

When large amounts of data must be sent quickly from one location to another, it is common practice to physically transport the data on storage devices (SD), such as hard disk drives, solid state disk drives, magnetic tape, and other media. Physical transfer is used because network transfers of large amounts of data can take weeks or months. For example, on a 100 Mbps connection, it can take over 120 days to transfer 100 terabytes of data. Today's storage devices have a large capacity and continuing improvements are expected. 14 terabyte hard drives and 100 terabyte SSD drives are now available. Similarly, physical storage devices must be used when data must be stored over time.

The use of physical storage devices introduces the possibility that they may be stolen while being transported or stored. They may also become corrupted or damaged. These risks of exposure or loss of data must be minimized in many important situations.

Moreover, in some situations, it may be difficult or impractical to transmit data on physical storage devices, such as when data needs to be received within a shortened period of time, or when weather, the climate, or a transportation route makes transporting physical storage devices difficult. In these cases, it may be advantageous to have a secure method of transmitting data which minimizes the risk of exposure of the data. While there are various conventional methods for transmitting electronic data securely, many of these methods are less secure than desired. For example, these conventional methods may leave the data prone to being viewed or accessed by unauthorized parties during transmit, and often times they do not provide any indication to the intended recipient of the data that there has been an intrusion.

Thus, a heretofore unaddressed need exists in the industry to address the aforementioned deficiencies and inadequacies. As such, methods and systems for providing highly secured network communication are presented herein.

SUMMARY OF THE DISCLOSURE

Embodiments of the present disclosure provide a system and method for secure network communications of data. In this regard, one embodiment of such a method, among others, can be broadly summarized by the following steps: providing source data; encrypting the source data to produce encrypted data and key data corresponding to the encrypted data; using quantum key distribution (QKD), transmitting, from a first network location, a first of the encrypted data or the key data; verifying successful transmission of the first of the encrypted data or the key data; using a QKD, transmitting, from the first network location, a second of the encrypted data or the key data; verifying successful transmission of the second of the encrypted data or the key data; and decrypting, at a second network location, the encrypted data with the key data to provide a data output.

In one aspect of the method, encrypting the source data comprises generating a random key equal to or greater in size than the source data size for every write request of the source data.

In another aspect of the method, verifying successful transmission of the encrypted data or the key data comprises detecting eavesdropping by an unauthorized party.

In this aspect, upon detection of eavesdropping by the unauthorized party, one or both of the encrypted data or the key data is retransmitted using QKD.

In yet another aspect, verifying successful transmission of the first of the encrypted data or the key data occurs at an earlier point in time than transmission of the second of the encrypted data or the key data.

In another aspect, the data source further comprises blockchain data.

In yet another aspect, the method further comprises varying the transmission of the encrypted data or the key data based on timing differences of failure rates of transmission.

The present disclosure can also be viewed as providing a system for secure network communication of data. Briefly described, in architecture, one embodiment of the system, among others, can be implemented as follows. Source data is provided. An encryption operator receives the source data and produces encrypted data and key data corresponding to the encrypted data. At least one network-enabled communication path is formed between a first network location and a second network location, wherein a first of the encrypted data or the key data is transmitted from the first network location to the second network location using QKD. At least one verification operator verifies successful transmission of the first of the encrypted data or the key data through the network-enabled communication path. A second of the encrypted data or the key data is transmitted from the first network location to the second network location using QKD. The at least one verification operator verifies successful transmission of the second of the encrypted data or the key data through the network-enabled communication path. A decryption operator decrypts, at the second network location, the encrypted data with the key data to provide a data output.

In one aspect of the system, encrypting the source data comprises generating a random key equal to or greater in size than the source data size for every write request of the source data.

In this aspect, the write request further comprises the use of a logical block number destination.

In another aspect, verifying successful transmission of the encrypted data or the key data comprises detecting eavesdropping by an unauthorized party.

In this aspect, upon detection of eavesdropping by the unauthorized party, one or both of the encrypted data or the key data is retransmitted using QKD.

In yet another aspect, verifying successful transmission of the first of the encrypted data or the key data occurs at an earlier point in time than transmission of the second of the encrypted data or the key data.

In another aspect, the data source further comprises blockchain data.

In yet another aspect, the transmission of the encrypted data or the key data is varied based on timing differences of failure rates of transmission.

In another aspect, the encryption operator further comprises an XOR operation.

The present disclosure can also be viewed as providing methods for secure network communications of data using quantum key distribution (QKD). In this regard, one embodiment of such a method, among others, can be broadly summarized by the following steps: providing source data located at a first network location; encrypting the source data to produce encrypted data and key data corresponding to the encrypted data, wherein a random bit size generator is used to generate a random bit size corresponding to every write request of the source data of a size equal to the random bit size, and a random key generator is used to generate a random key equal to or greater in size than the random bit size; using QKD, transmitting the key data from the first network location to a second network location; verifying successful transmission of the key data to the second location; upon verification of successful transmission of the key data to the second location, transmitting the encrypted data using QKD from the first network location to the second network location; verifying successful transmission of the encrypted data to the second location; and upon verification of successful transmission of the encrypted data to the second location, decrypting the encrypted data with the key data to provide a data output.

In one aspect of the method, verifying successful transmission of the key data or the encrypted data comprises detecting a level of eavesdropping by an unauthorized party at or below a predetermined threshold.

In another aspect, verifying successful transmission of the key data occurs at an earlier point in time than transmission of the encrypted data.

In yet another aspect, decrypting the encrypted data with the key data comprises: receiving the encrypted data and key data; receiving logical block number (LBN) destination associated with the source data and an integer associated with a number of bytes of the source data; identifying the number of bytes of encrypted data; identifying the same number of bytes of key data; and initiating an operation to combine the encrypted data with the key data to reconstruct the source data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 2B:
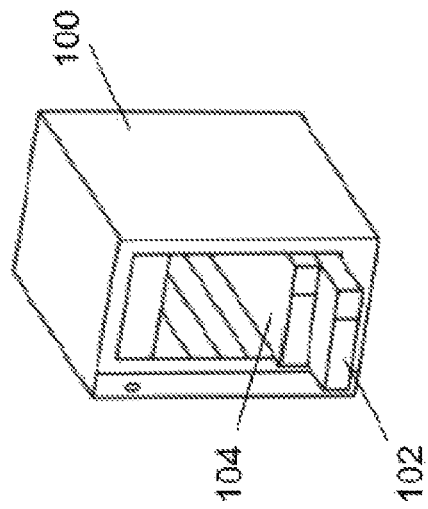
FIGS. 2A-2B depict the storage device controller of FIG. 1 with the two removable storage devices being removable in accordance with embodiments of the present invention.

Modern applications are generating vast amounts of data. A small fleet of drones can generate 100 terabytes of data per day. The sensors on a single autonomous vehicle can generate 4 terabytes of data per day. Animated movie files can occupy as much as 250 terabytes of storage. Transmitting large amounts of data over networks can take weeks or months (e.g. it can take over 120 days to transfer 100 terabytes of data on a 100 Mbps network connection.)

Today's storage devices have a large capacity and continuing improvements are expected. 14 terabyte hard drives and 100 terabyte SSD drives are now available. Magnetic tape continues to be an important medium for high density storage. In many situations, physical transport of storage media is preferred to transfer over networks. With modern storage media, larger amounts of data can be rapidly transported physically. Data sent over a network like the internet can also be vulnerable to cyber-attacks.

When data is transported or stored physically today, it is often encrypted using a small key onto a single storage device. Today's common encryption methods are vulnerable to hardware flaws, quantum computation, side channel attacks, and other problems. If the few bits of a standard encryption key are obtained by an attacker, they can use them to expose terabytes of important data. Secure transport and storage of large amounts of data known in the prior art requires numerous compromises to security and convenience.

To improve over these deficiencies in the industry, embodiments of the present disclosure provided herein utilize a unique, dynamically generated, and very long encryption key for every write operation to the data storage media. The number of bits in each encryption key is always greater than or equal to the number of bits in the data being written. The encryption keys are written to their own media and the encrypted data is written to another. In its simplest embodiment, only with access to both the encryption key media and the encrypted data media can the original data be read.

The encryption and decryption functions of the present disclosure can be computed extremely efficiently and can be implemented in hardware without need of a dedicated CPU. This allows the systems and methods of the present disclosure to be much faster, use less power, and be more efficient than existing technologies. In a primary example, the present disclosure relates to the highly secured transport and storage of large amounts of data. This capability is becoming increasingly important because new applications are generating more and more data which must be kept secure.

The non-limiting embodiments of the present disclosure solve the problems of the prior art in an efficient, reliable, and easy to use manner. They provide a cryptographically unbreakable method of securing data while it is being transported or preserved in storage facilities. This method secures the data in a way that is immune to further advances in cryptanalysis such as quantum cryptanalysis. It is also immune to all known side-channel attacks on popular private and public key cryptographic schemes.

Figure 2A:
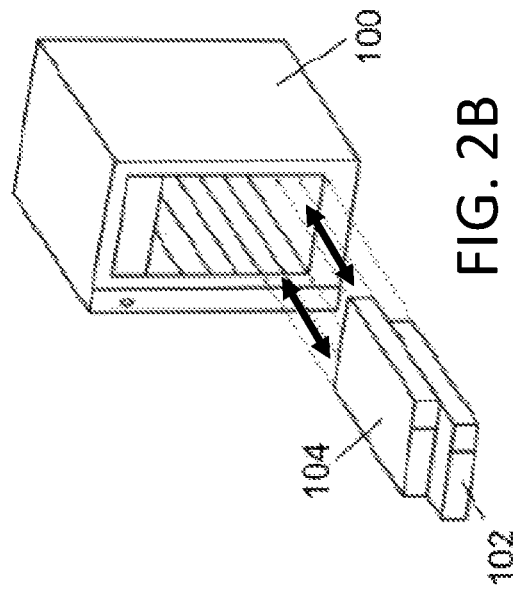
Figure 1:
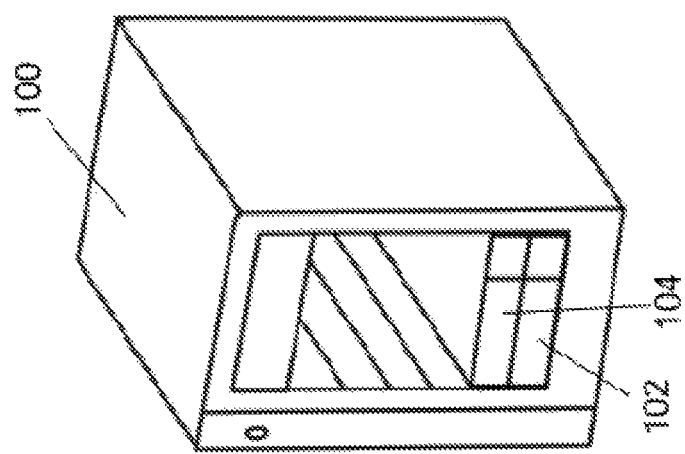
FIG. 1 depicts two removable storage devices inserted into a storage device controller, in accordance with embodiments of the present invention.

Turning to the figures, FIG. 1 depicts two removable storage devices 102, 104 inserted into a storage device controller 100, in accordance with embodiments of the present invention. FIGS. 2A-2B depict the storage device controller of FIG. 1 with the two removable storage devices 102, 104 being removable, in accordance with embodiments of the present invention. With reference to FIGS. 1-2, the storage device controller 100 may comprise an array of one or more SD controllers which includes a physical housing or I/O port capable of receiving or electronically connecting to two or more storage devices (SDs) 102, 104. The SDs 102, 104 may include any type of physical storage medium, such as hard disk drives, solid state disk drives, magnetic tape, and other media. The storage device controller 100 may be connectable, directly or indirectly, to a source supplying data, such as a server, a desktop computer, a laptop computer, or another type of computerized device. As shown in FIGS. 2A-2B, the SDs 102, 104 are removable from the storage device controller 100, in that, the physical units of the SDs 102, 104 may be inserted into and removed from the storage device controller 100.

Figure 3:
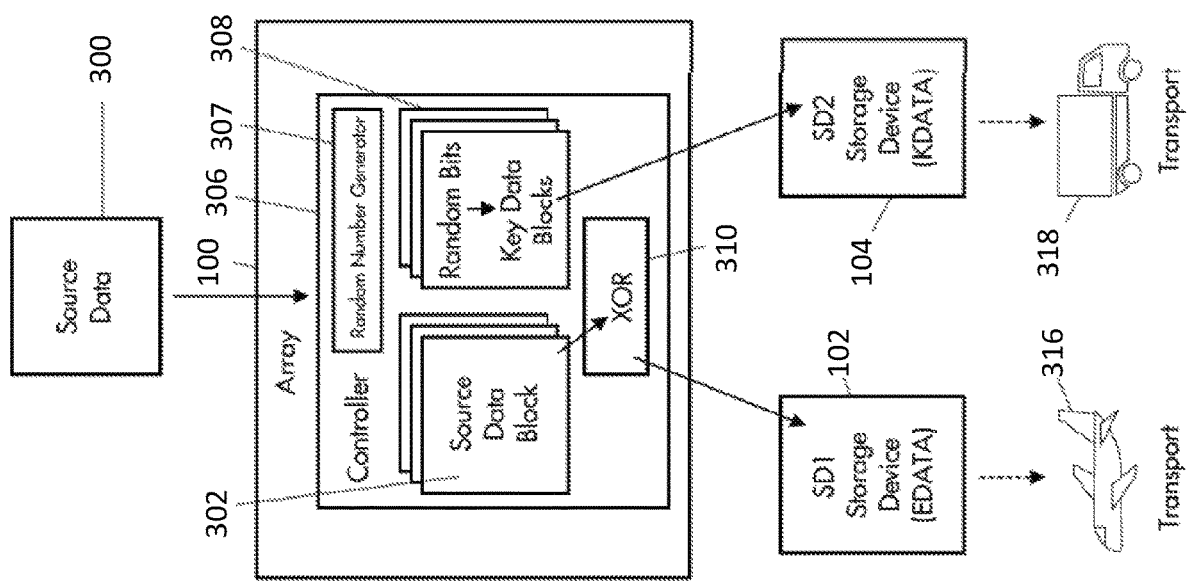
FIG. 3 depicts a flowchart of the encryption process for two or more storage devices, in accordance with embodiments of the present invention.
Figure 4:
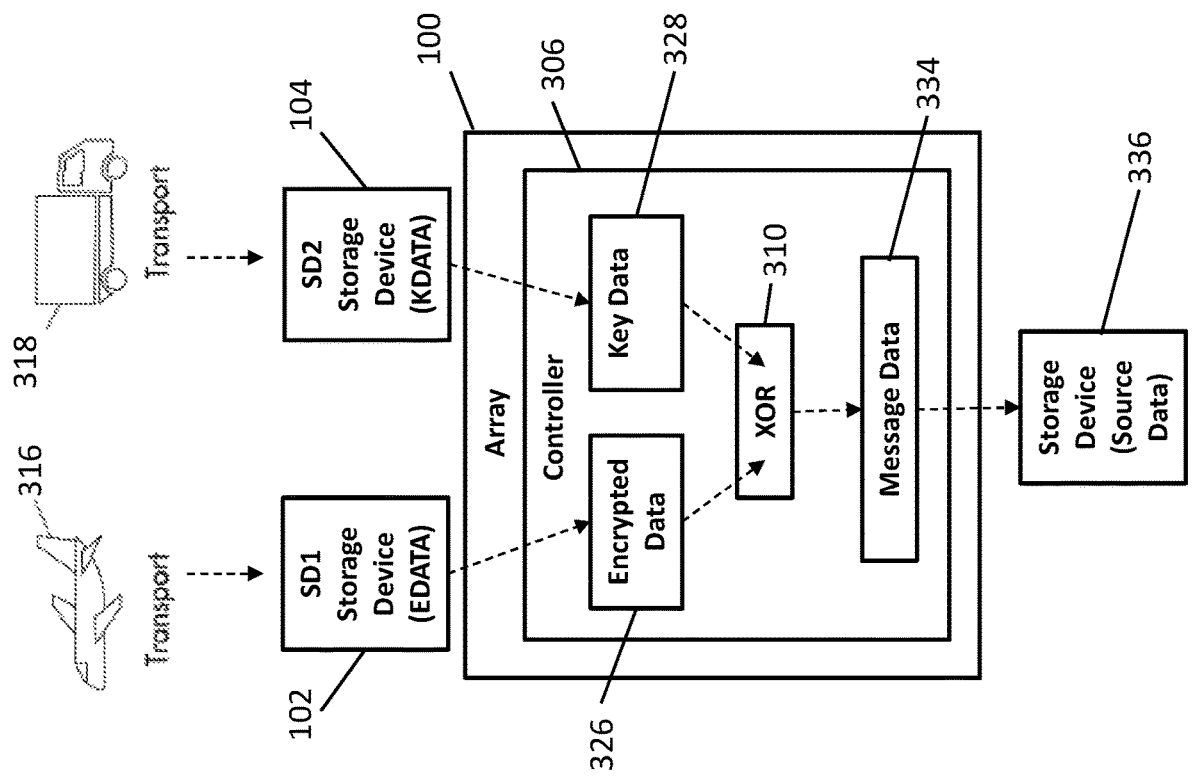
FIG. 4 depicts a flowchart of the decryption process for two or more storage devices, in accordance with embodiments of the present invention.
Figure 5:
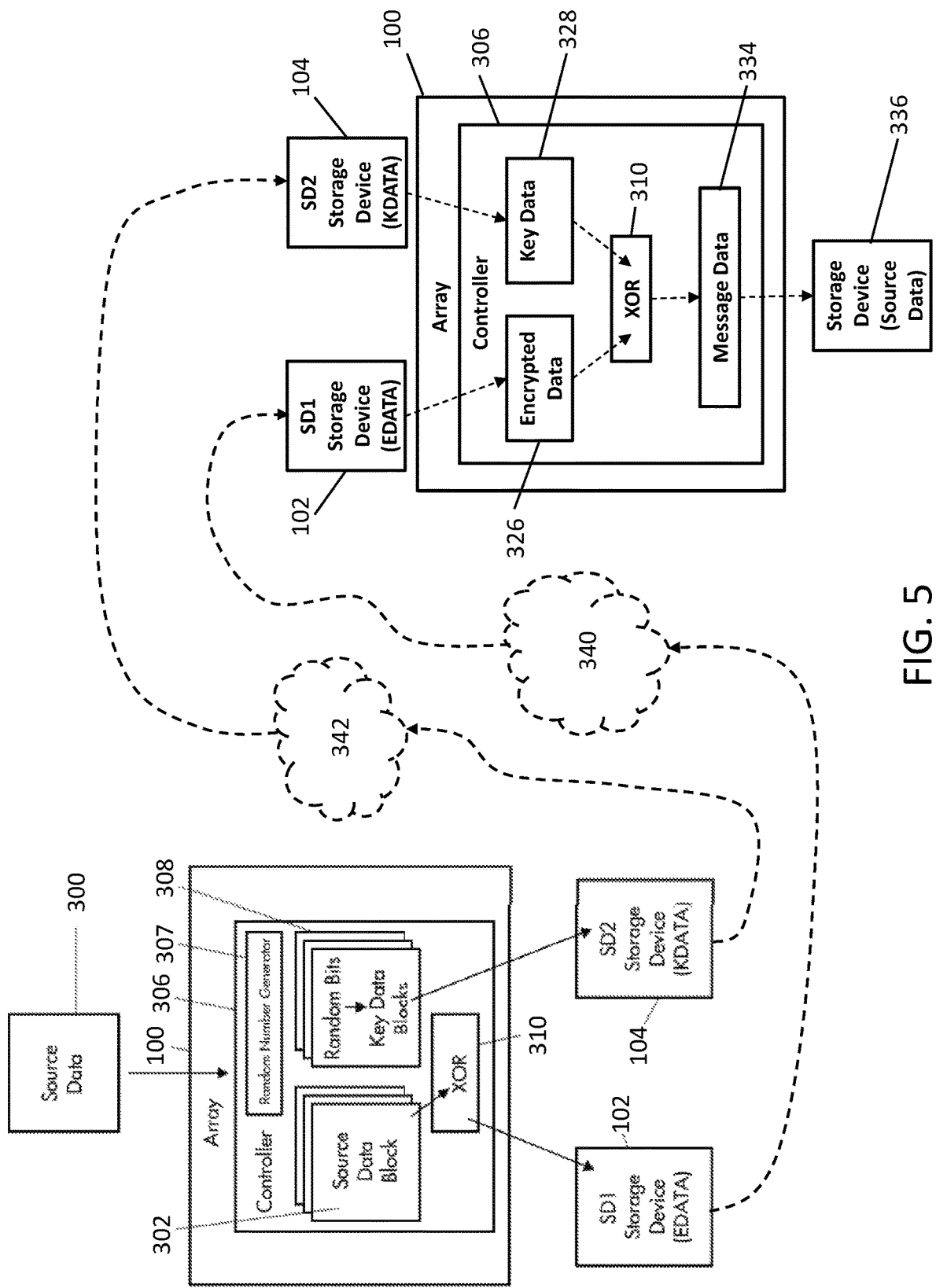
FIG. 5 depicts a flowchart of the encryption process for two or more storage devices, the transport of at least two of those devices, and the decryption from any two of the original devices to recover the original data, in accordance with embodiments of the present invention.

The encryption and decryption process of the SDs 102, 104 is described relative to FIGS. 3-5. In particular, FIG. 3 depicts a flowchart of the encryption process for the SDs 102, 104, and FIG. 4 depicts a flowchart of the decryption process for the SDs 102, 104, in accordance with embodiments of the present invention. FIG. 5 depicts a flowchart of both the encryption process and the decryption process, as well as the transportation of the SDs 102, 104 between encryption and decryption, in accordance with embodiments of the present invention. With reference to FIGS. 1-5 together, the source of the data 300 which is to be secured or encrypted is connected to the storage device controller 100. The storage device controller 100 is connected to the two or more removable storage devices 102 and 104. The source data 300 is in communication with a controller unit 306 of the storage device controller 100, and the data source 300 sends write and read requests to the controller unit 306. When this occurs, the controller unit 306 encrypts the source data and stores the resulting encrypted data on the removable storage devices 102, 104, in such a way that the original data can be reconstructed from a large enough subset of the storage devices but no information is revealed from any smaller subset.

To secure or encrypt the source data 300, the source data 300, or a portion thereof, is copied onto the controller data buffer or source data block 302 of the controller unit 306. The controller unit 306 has access to a random number generator 307 and a random bit size generator 308, which may be located within the controller unit 306 or external to it, such as within the attached computer or another computing system. The random number generator 307 generates a random key or number equal to or greater in size than the random bit size. Then, the random bit size generator 308 generates a random bit size corresponding with every write request of the data source 300 of a size equal to the random bit size. Each key data block is the same size as the source data 300 and is generated by the high quality random number generator 307. The data from the data source 300 which is copied onto the source data block 302 is then combined with one or more key data blocks derived from the random bit size generator 308 using a XOR operation 310, or a similar technique. The resulting encoded data is stored on the SDs 102 and 104, with the encoded data stored on the first SD 102 and the key data stored on the second SD 104, in a way which guarantees the desired properties.

Once the encoded data is written to the storage devices 102, 104, the user simply removes them from the storage device controller 100 and transports them independently to the destination. Independent transportation of the storage devices 102, 104 may include separate vehicular transportation, being transported along different geographical routes, using different transportation carriers, conducting transportation at different times, or other methods for separate transportation. For clarity in disclosure, FIGS. 3-4 identify the different transportation mediums as an airplane 316 and a truck 318, but any other means of separate or independent transportation is considered within the scope of the present disclosure.

Once the SDs 102, 104 arrive at the destination, as shown in FIG. 4, the user inserts the SDs 102, 104 into the original storage device controller 100 or another storage device controller 100. The storage device controller 100 then recreates any desired portions of the original data by combining the information from the individual SDs 102, 104. More specifically, as depicted in FIG. 4, the encoded data of the first SD 102 and the key data of the second SD 104 are received within the controller unit 306 within the storage device controller 100. The controller unit 306 receives a logical block number (LBN) destination associated with the desired data and an integer giving the number of bytes to fetch. The controller unit 306 then fetches that number of bytes of data of the first SD 102 into a controller buffer 326. The controller unit 306 also fetches that same number of bytes of data from the second SD 104 and into a data buffer 328. As the data is fetched, the controller initiates the XOR operation 310 to combine the data within the second SD 104 with the data in the first SD 102 already in the buffer. This results in the reconstruction of the source data which resides in the data buffer 334. This reconstructed source data is then delivered or output from the storage device controller 100 to the data destination 336, such as a data storage device used by the requester of the data.

FIGS. 1-5 illustrate the present disclosure in use with two storage devices. The removable storage device controller 100 may have two slots for storage devices 102, 104 to be inserted into, as shown in FIG. 1. The SDs 102, 104 may include any type of device for storing data, such as hard disks, SSD disks, magnetic tapes, or others. The storage device controller 100 may be connected to a computer or other device which introduces the data source through write and read requests to the storage device controller 100. The two removable SDs 102, 104 may be inserted into the two slots of the controller 100, where the controller unit 306 responds to write and read requests in real-time by writing and reading data to and from the storage devices.

Once the controller 100 is connected to the computer or other data source and the two SDs 102, 104 are inserted into it, the data source 300 may read and write data for as long as desired. For example, the data source 300 may be a video editor which reads and writes high-value video information to the controller. Once all of the desired message data of the data source 300 has been sent to the controller 100, the SDs 102, 104 may be removed from it.

To securely store the encoded message data of the SDs 102, 104, the SDs 102, 104 may be stored, transported, or otherwise handled independently and/or separately. For example, the SDs 102, 104 may be physically stored in separate locations (for example bank vaults or safety deposit boxes). If one of these locations is compromised, the data on that single storage device provides no information about the secured message data.

With regards to transportation, FIG. 5 schematically illustrates separate or independent transportation mediums, where the encoded data in the first SD 102 is transported along a first transportation medium 340 whereas the key data within the second SD 104 is transported along a second transportation medium 342. The transportation mediums 340, 342 may include any type, format, or means of transportation which allows SD 102 and SD 104 to remain separate from one another. For example, to transport the encoded message data to another location, the two storage devices 102 and 104 may be sent to that location preferably by separate transport methods and/or on separate paths. If one of the devices is stolen or otherwise compromised, it provides no information about the message to the attacker. For example, one SD might be sent by private courier, another SD by a different method, such as a FEDEX® delivery service, etc. Interception of fewer than the specified number of disks provides no information about the source data. Upon arrival at their destination, all of the SDs are inserted into the invented SD system to recover the source data, as described herein.

Another way to achieve high security while transporting the SDs is to use temporal sequencing. For example, one SD 102 could be transported first, and only after its confirmed receipt, are the remaining SDs (e.g. 104) transported. Thus, one SD may be sent during a first time period and the second SD to be transported in a second time period, only after confirmation of receipt of the first SD. In this way, the chances of both SDs 102, 104 being compromised can be effectively eliminated. The different transportation mediums may include, without limitation, separate vehicular transportation, transportation along different geographical routes, transportation using different transportation carriers, conducting transportation at different times, or other methods for separate transportation.

In addition, when the data must be physically archived at storage facilities, one SD 102 can be preserved at one archive facility while the other SD(s) (e.g. 104) are preserved at other archive facilities. In order to reconstruct the source data, the SD(s) must be fetched and inserted into an appropriate SD controller 100. Additional security and auditability can be provided by physically securing SDs in tamper-proof or tamper-evident physical containers. For example, these may involve physical locks.

As described herein, the message data is combined with the random key using the XOR function 310. However, there are many similar alternatives to using the XOR function 310 which may be used, as would be recognized by one skilled in the art. For example, an 8-bit byte of message data 302 might be combined with an 8-bit byte of the random key data 308 by using addition modulo 256. To decrypt the data, an encrypted byte would subtract the stored random key byte modulo 256. Alternatively, an 8-bit byte of message data might be combined with an 8-bit byte of random key data by subtracting it from modulo 256. In that case, decryption would add the encrypted byte to the stored random key byte modulo 256. Many other possibilities may also be used, as may be recognized by one skilled in the art.

In some situations, it may be more convenient to have a stand-alone removable storage device controller with an additional slot for a storage device containing the message data. For example, an embodiment might have three slots: the first for the source message storage device and the other two for the encrypted data storage devices 102 and 104. To perform the encryption, the message storage device would be inserted into the first slot and the two encryption storage devices 102 and 104 would be inserted into the second and third slots. The storage device controller 100 would read data from the source device 300, combine it with random key bits generated from a random source 307, and then write the encrypted data to the second and third devices 102 and 104 as described above. When the encryption is complete, the user removes the second and third devices and transports them to the destination independently. At the destination, the storage devices are inserted into a controller along with a blank third storage device, e.g., such as storage device 336 as shown in FIG. 5. The controller reads the information from the two encrypted devices 102 and 104 and reconstructs the original message on the blank storage device 336.

As a working example of the present disclosure, the following is one example of the process by which the controller handles a write request for 4096 bytes of message data to the two storage devices:

The SOURCE data 300 and the logical block number (LBN) destination of the source data are received by the storage device (SD) system's controller. In this example, 4096 bytes of source data are to be written to LBN 30. Although 4096 bytes are used in this example, embodiments may utilize any number of bytes without limitation. Likewise, one skilled in the art will recognize that "LBN 30" is utilized for illustrative purposes only as data may be written to any logical block without limitation.

The SOURCE data is copied into a controller data buffer.

For each write operation, the controller generates a new 4096-byte one-time-pad key (KDATA) of 4096*8 random bits. This process could be done using a random number generator (RNG). The RNG could be based on shot noise, quantum fluctuations, or other method to produce perfectly random bits. Many modern microprocessor chips include built-in hardware random number generators. If faster but less secure encryption is desired, a pseudo-random number generator (PRNG) could be used to produce the random bits from a smaller set of physically generated truly random bits. Embodiments may balance the number of physically random bits and the number of pseudorandom bits according to the security requirements and the properties of the random source.

The 4096 bytes of copied SOURCE data undergoes an XOR operation (exclusive OR bit operation) with the KDATA to produce 4096 bytes of encrypted data (EDATA).

The EDATA is written to LBN 30 on the first storage device (SD1).

The KDATA is written to LBN 30 on the second storage device (SD2).

Because a new one-time-pad key is generated and used for each write operation, the encrypted data is cryptographically unbreakable and is immune to side-channel attacks.

The following is an embodiment of the process of fetching 4096 bytes of message data from the SD controller:

The SD controller at the destination receives the LBN of the desired data and an integer giving the number of bytes to fetch. In this example, 4096 bytes of data are requested from LBN 30.

The controller fetches 4096 bytes of data from LBN 30 of SD1 into a controller buffer.

The controller fetches 4096 bytes of data from LBN 30 of SD2 into the data buffer, but as the data is fetched, the controller XORs the SD2 data with the SD1 data already in the buffer.

This results in the reconstructed SOURCE data residing in the data buffer.

The reconstructed SOURCE data is delivered from the SD controller to the requester of the data.

Figure 6:
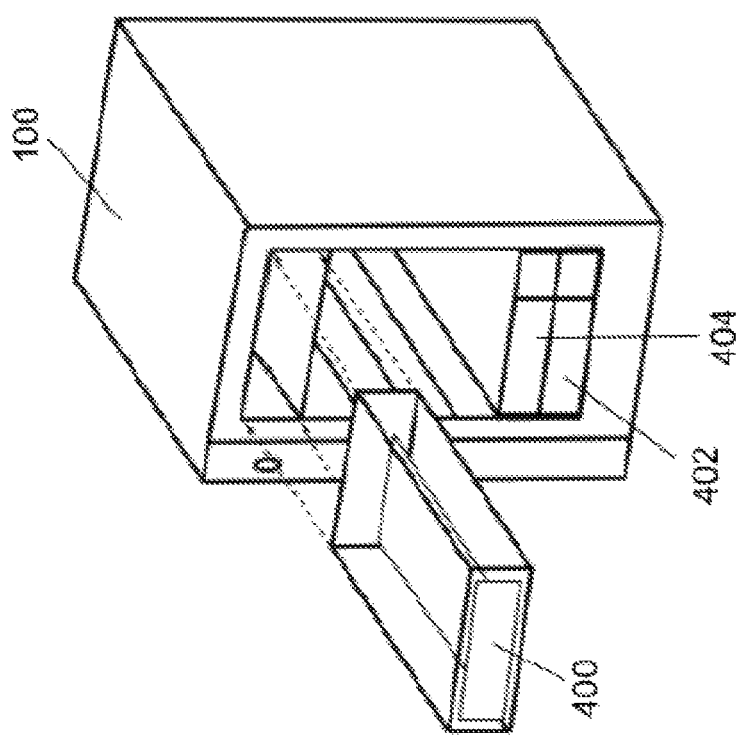
FIG. 6 depicts a storage device controller designed to fit into a standard disk slot in a computer or RAID array with two removable storage devices inserted into it, in accordance with embodiments of the present invention.

FIG. 6 depicts a storage device controller designed to fit into a standard disk slot in a computer or RAID array with two removable storage devices inserted into it, in accordance with embodiments of the present invention. In particular, FIG. 6 depicts an example in which the storage devices are designed to fit into a container that has a standard form factor for storage devices. For example, it might fit into a standard 5.25 inch slot for a hard drive and it might have two slots for smaller SSD drives. This design may allow the controller to be conveniently built into a standard computer, a Redundant Array of Independent Disks (RAID) array of disk drives 402 and 404, or other standard storage system. The SD system 400 can act as a single drive unit when it is part of a standard RAID array storage system. For example, in a RAID 1 array (also known as mirroring), the SD system 400 can participate as either or both of the RAID 1 array disks. In addition, multiple SD systems, each acting as a single drive unit, can be part of any type of RAID array. All other aspects of the controller 100 are the same as described relative to FIGS. 1-5.

Figure 7:
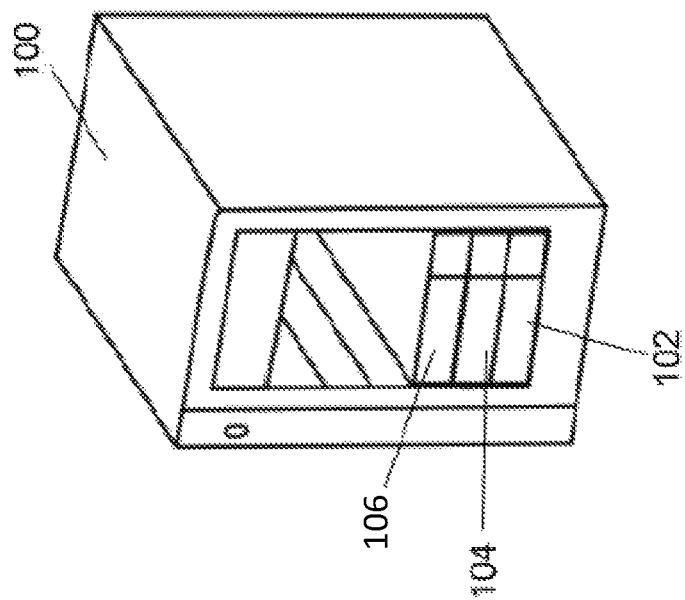
FIG. 7 depicts an embodiment with three removable storage devices inserted into a storage device controller, in accordance with embodiments of the present invention.

FIGS. 1-5 are described relative to using two encrypted storage devices: the first SD 102 and the second SD 104. In this example, the message data is secure if only one of those disks is stolen or compromised, but the message may be revealed if both disks are stolen or compromised. In some situations, it may be beneficial to use more than two storage devices. To this end, FIG. 7 depicts an embodiment with three removable storage devices inserted into a storage device controller, in accordance with embodiments of the present invention. Referring to FIG. 7, a removable storage device controller 100 has three slots and three storage devices 102, 104, and 106 holding the encrypted information. In this embodiment, all three encrypted storage devices must be present for decryption. This increases the level of security because an attacker must compromise three separate transportation or storage channels to expose the message information.

When three SDs 102, 104, and 106 are used, it may be necessary to use two random key blocks for each block of message bits and provides a greater level of security. Each of the three SDs 102, 104, and 106 must be present to reconstruct the source data (300 in FIG. 3). The encoding combines the original source data with the two random key blocks 308 by bitwise XOR. In this example, if the two random key blocks are labelled KEY1 and KEY2, then the contents of the three SDs 102, 104, and 106 after encryption are:

SD1: (SOURCE XOR KEY1 XOR KEY2)
SD2: KEY1
SD3: KEY2

Encoding is performed in the controller, as described relative to FIGS. 1-5, and these encrypted contents are stored on the three SDs 102, 104, and 106. The three SDs 102, 104, and 106 are separated and either stored or transported until the source data needs to be reconstructed. They are then brought together, and the reconstruction is performed by the following operation:

(SOURCE XOR KEY1 XOR KEY2) XOR KEY1 XOR KEY2

This mathematically reconstructs the source data. No information about the source data is extractable from any single SD 102, 104, or 106 or from any two of the SDs 102, 104, or 106. Thus, this use of three SDs may provide an increased level of security over using only two SDs.

Indeed, the number of SDs may vary and include any number of devices greater than two. Accordingly, the number of SDs may be generalized to an arbitrary number N (greater than or equal to two) of storage devices. Designs of the system and method which include N SDs will require N−1 random key blocks. For example, the first SD 102 holds the source data combined with all N−1 keys, for example by XORing them together, and each of the remaining SDs holds one of the keys as follows:

SD1: SOURCE XOR KEY1 XOR . . . XOR KEY(N−1)
SD2: KEY1
. . .
SDN: KEY(N−1)

To reconstruct the SOURCE data, all N SDs must be present, and their contents are bitwise XORed together. Any subset of SDs smaller than N provides no information about the source data. This increases the security to any desired level. It forces an attacker to compromise N different transportation channels or storage locations in order to access any of the message bits. It is noted that the system and method described herein may allow for virtually unlimited permutations of number of SDs used. For example, requiring that two out of three disks be reunited to unencrypt the data, or three out of five, or other permutations as security needs require.

While the system and method of this disclosure provide an arbitrary level of unbreakable security, if one or more of the storage devices is lost or damaged, the message information becomes irretrievable. To prevent this situation, three SDs 102, 104, and 106 may be used in such a way that the message can be retrieved from any two of the SDs but no information is revealed should an attacker attain access to only one of the SDs. This provides robustness against the failure or loss of any one of three SDs 102, 104, and 106. It requires that each SD store twice as much data as in the original source, as the contents of the three SDs 102, 104, and 106 after encryption consist of:

SD1: KEY1 and (SOURCE XOR KEY2)
SD2: KEY2 and (SOURCE XOR KEY3)
SD3: KEY3 and (SOURCE XOR KEY1)

Any single SD 102, 104, or 106 reveals no information about the original source. But the original source data can be reconstructed from any two of the storage devices. There are 3 possibilities:

From SD1 and SD2, perform the XOR of (SOURCE XOR KEY2) from SD1 with KEY2 from SD2 to reconstruct SOURCE.

From SD2 and SD3, perform the XOR of (SOURCE XOR KEY3) from SD2 with KEY3 from SD3 to reconstruct SOURCE.

From SD3 and SD1, perform the XOR of (SOURCE XOR KEY1) from SD3 with KEY1 from SD1 to reconstruct SOURCE.

In this example, the user is protected against the theft or compromise of any single storage device and the loss or failure of any single storage device. It is a convenient, robust, and highly secure practical means for transporting or storing large amounts of data.

This example may further be generalized to four SDs, which allow any single SD to fail or be lost and the source data to still be reconstructed. Any fewer than three SDs provide no information about the source data. After encryption, the contents of the four SDs are:

SD1: KEY1 and (SOURCE XOR KEY2 XOR KEY3)
SD2: KEY2 and (SOURCE XOR KEY3 XOR KEY4)
SD3: KEY3 and (SOURCE XOR KEY4 XOR KEY1)
SD4: KEY4 and (SOURCE XOR KEY1 XOR KEY2)

Any single SD reveals no information about the source. Any two SDs reveal nothing about the source, because the source is always XORed with a key which is not available on the two disks. Any subset of three disks, however, allows reconstruction of the source data. There are four possibilities:

From SD1, SD2 and SD3, perform the XOR of (SOURCE XOR KEY2 XOR KEY3) from SD1 with KEY2 from SD2 and KEY3 from SD3 to reconstruct SOURCE.

From SD2, SD3 and SD4, perform the XOR of (SOURCE XOR KEY3 XOR KEY4) from SD2 with KEY3 from SD3 and KEY4 from SD4 to reconstruct SOURCE.

From SD3, SD4, and SD1, perform the XOR of (SOURCE XOR KEY4 XOR KEY1) from SD3 with KEY4 from SD4 and KEY1 from SD1 to reconstruct SOURCE.

From SD4, SD1, and SD2, perform the XOR of (SOURCE XOR KEY1 XOR KEY2) from SD4 with KEY1 from SD1 and KEY2 from SD2 to reconstruct SOURCE.

In applications with a greater need for robustness against device loss or failure, four storage devices may be used, such that any two of the SDs are sufficient for decrypting the original source data. This allows any two SDs to fail or to be lost and the source data to still be reconstructed. Any single SD reveals no information about the source data. But in this example, an attacker must not get access two SDs for the message to remain secure. Here are the contents of the four SDs after encryption:

SD1: (SOURCE XOR KEY1)
SD2: KEY1 and (SOURCE XOR KEY2)
SD3: KEY1, KEY2, and (SOURCE XOR KEY3)
SD4: KEY1, KEY2, and KEY3

There are 6 possibilities for reconstruction from two SDs:

From SD1 and SD2, perform the XOR of (SOURCE XOR KEY1) from SD1 with KEY1 from SD2 to reconstruct SOURCE.
From SD1 and SD3, perform the XOR of (SOURCE XOR KEY1) from SD1 with KEY1 from SD3 to reconstruct SOURCE.
From SD1 and SD4, perform the XOR of (SOURCE XOR KEY1) from SD1 with KEY1 from SD4 to reconstruct SOURCE.
From SD2 and SD3, perform the XOR of (SOURCE XOR KEY2) from SD2 with KEY2 from SD3 to reconstruct SOURCE.
From SD2 and SD4, perform the XOR of (SOURCE XOR KEY2) from SD2 with KEY2 from SD4 to reconstruct SOURCE.
From SD3 and SD4, perform the XOR of (SOURCE XOR KEY3) from SD3 with KEY3 from SD4 to reconstruct SOURCE.

These non-limiting embodiments show only a few of the possibilities that one skilled in the art may construct. There are a wide variety of similar encryption formulas that allow embodiments to meet a wide variety of user needs.

Figure 8:
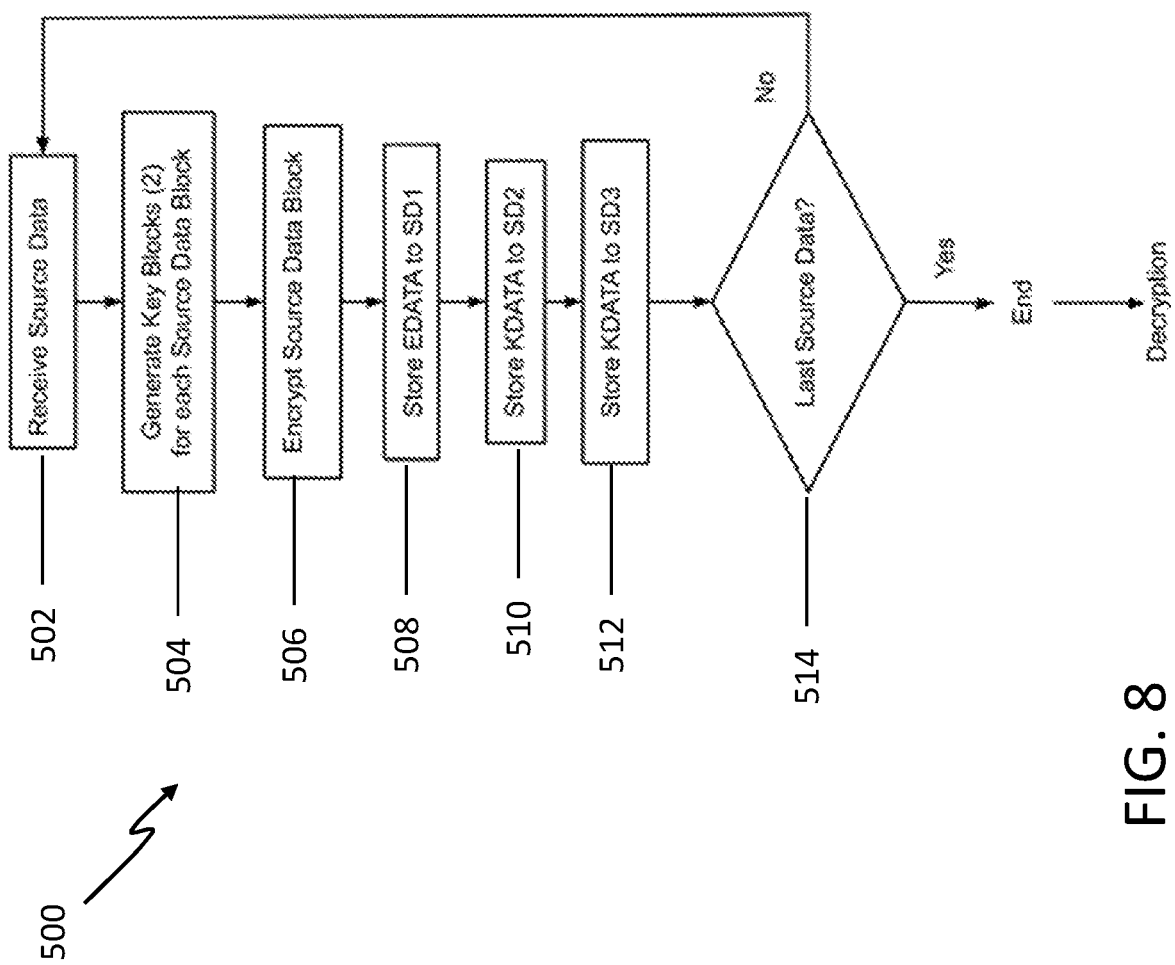
FIG. 8 is an illustrative method for encrypting data, in accordance with embodiments of the present invention.

FIG. 8 is a flowchart 500 illustrating a method of generating secure data for transport using three SDs, in accordance with embodiments of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 502, source data from the data source is received. At block 504, two or more key blocks may be generated for each source data block. The source data block may then be encrypted (block 506). The encrypted or encoded data is stored on a first SD (block 508), the key data is stored on a second SD (block 510) and the key data is stored on a third SD (block 512). At block 514, confirmation of the last source data is made. If additional data is required for encryption, the process may begin again. If the data for encryption is received in full, the encryption process may end. At this point, the SDs may be transported to a destination location, where the source data is decrypted. Any number of additional steps, functions, processes, or variants thereof may be included in the method, including any disclosed relative to any other figure of this disclosure.

While FIGS. 1-8 discuss systems and methods for securely transmitting data using physical storage devices, it may also be possible to securely transmit data through purely electronic transmission. Transmitting data electronically without the need for a physical storage device may be useful in certain situations where use of a physical storage device is impractical or where environmental conditions make it difficult. For example, the use of physical storage devices may not be suitable for data that needs to be transmitted within short periods of time where the time for transporting the physical storage device is too great, such as for data transmission between individuals residing on different continents. Additionally, in certain situations, the environmental conditions may make it difficult for transporting physical storage devices, for example, data transmission to underground or underwater facilities, to airplanes or spacecraft, or to locations with hazardous climates. In these situations, it may be possible to transmit data securely without the use of physical storage devices.

In accordance with a second embodiment of the present disclosure, FIGS. 9A-12 disclose systems and methods for highly secured network communications without the use of physical data storage devices. It is noted that many of the features, functions, or processes disclosed relative to FIGS. 1-8 may be used with the second embodiment of FIGS. 9A-12, all of which are incorporated by reference herein. The highly secured network communications disclosed relative to FIGS. 9A-12 may use quantum technologies, and in particular using quantum key distribution (QKD). QKD is a secure communication method which utilizes a cryptographic protocol involving components of quantum mechanics, whereby a random secret key is produced and shared between two parties. The key is known only to the two parties, such that it can then be used to encrypt and decrypt messages. A specific feature of QKD is the ability of the two communicating users to detect the presence of any unauthorized third party trying to gain knowledge of the data transmitted through QKD. This feature stems from the fact that the process of measuring a quantum system, in general, acts to disturb the system. Thus, a third party trying to eavesdrop on the data transferred using QKD must in some way measure it, which causes detectable anomalies within the data. By using quantum superpositions or quantum entanglement and transmitting information in quantum states, a communication system can be implemented that detects eavesdropping, such that one can identify that the transmission was not secure.

Figure 9A:
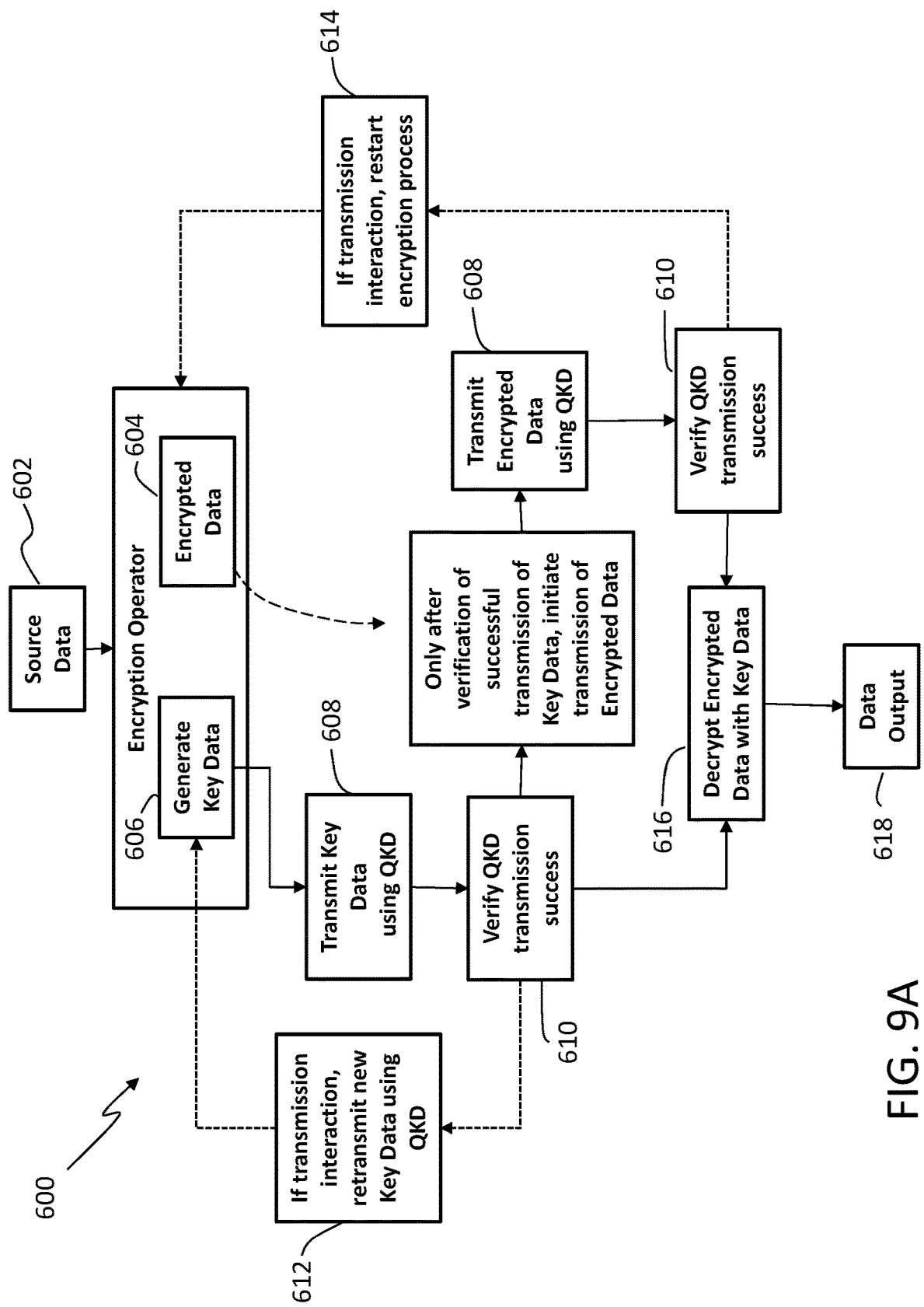
FIG. 9A depicts a flowchart of highly secured encryption process for network communication using quantum technologies, in accordance with a second embodiment of the present invention.

FIG. 9A depicts a flowchart 600 of highly secured encryption process for network communication using quantum technologies, in accordance with a second embodiment of the present invention. As shown, a quantity of source data is provided at block 602. The source data may include any type of data or any size data, e.g., any number of bits, which can be transmitted over an electronic network. An encryption operator receives the source data and encrypts it to produce encrypted data 604. The encryption operator also produces key data 606 corresponding to the encrypted data 604. The key data 606 is then transmitted through at least one network-enabled communication path between a first network location and a second network location, which may be any locations on a computerized network, such as the Internet, a WAN, a LAN, or another network. Transmission of the key data 606 occurs using QKD, as shown at block 608, while the encrypted data 604 is not transmitted. For example, the key data 606 is first sent from the first network location to the second network location using QKD, while the encrypted data 604 remains secure at the first network location. Only after the key data 606 arrives at the second network location, the success of the transmission may be verified at 610. Verifying the success of the transmission uses QKD and determines whether the key data 606 has been accessed, eavesdropped on, listened to, viewed, or otherwise interacted with by an unauthorized third party.

If verification of the successful transmission of the key data 606 is complete, then the encrypted data 604 may be transmitted at block 608 along the network path. It is noted that the encrypted data 604 is not sent until only after the key data set 606 is verified to have successfully completed transmission. When the encrypted data 604 arrives at the destination location of the network, the success of the transmission may be verified at 610. In the same manner as with the key data 606, verifying the success of the transmission of the encrypted data 604 uses QKD and determines whether the encrypted data 604 has been eavesdropped, listened to, viewed, or otherwise interacted with by an unauthorized third party. If verification of the successful transmission of the encrypted data 604 is complete, the encrypted data 604 and key data 606 may be recombined at block 616 to decrypt the encrypted data 604.

Decryption may involve a decryption operator using an XOR operation, or similar technique. For example, the message data may be combined with the random key using a XOR function. However, there are many similar alternatives to using the XOR function which may be used, as would be recognized by one skilled in the art. For example, an 8-bit byte of message data might be combined with an 8-bit byte of the random key data by using addition modulo 256. To decrypt the data, an encrypted byte would subtract the stored random key byte modulo 256. Alternatively, an 8-bit byte of message data might be combined with an 8-bit byte of random key data by subtracting it from modulo 256. In that case, decryption would add the encrypted byte to the stored random key byte modulo 256. Many other possibilities may also be used, as may be recognized by one skilled in the art. Once decryption is complete, the resulting, decrypted data, is then output at the data output 618, as shown in FIG. 9A.

In FIG. 9A, the key data 606 is transmitted first while the encrypted data 604 is withheld from transmission until verification that the key data 606 was successfully transmitted. In this way, the key data 606 and the encrypted data 604 are never in transit at the same time. However, it is noted that either the key data 606 or the encrypted data 604 may be sent first, while the other is withheld pending verification.

Figure 9B:
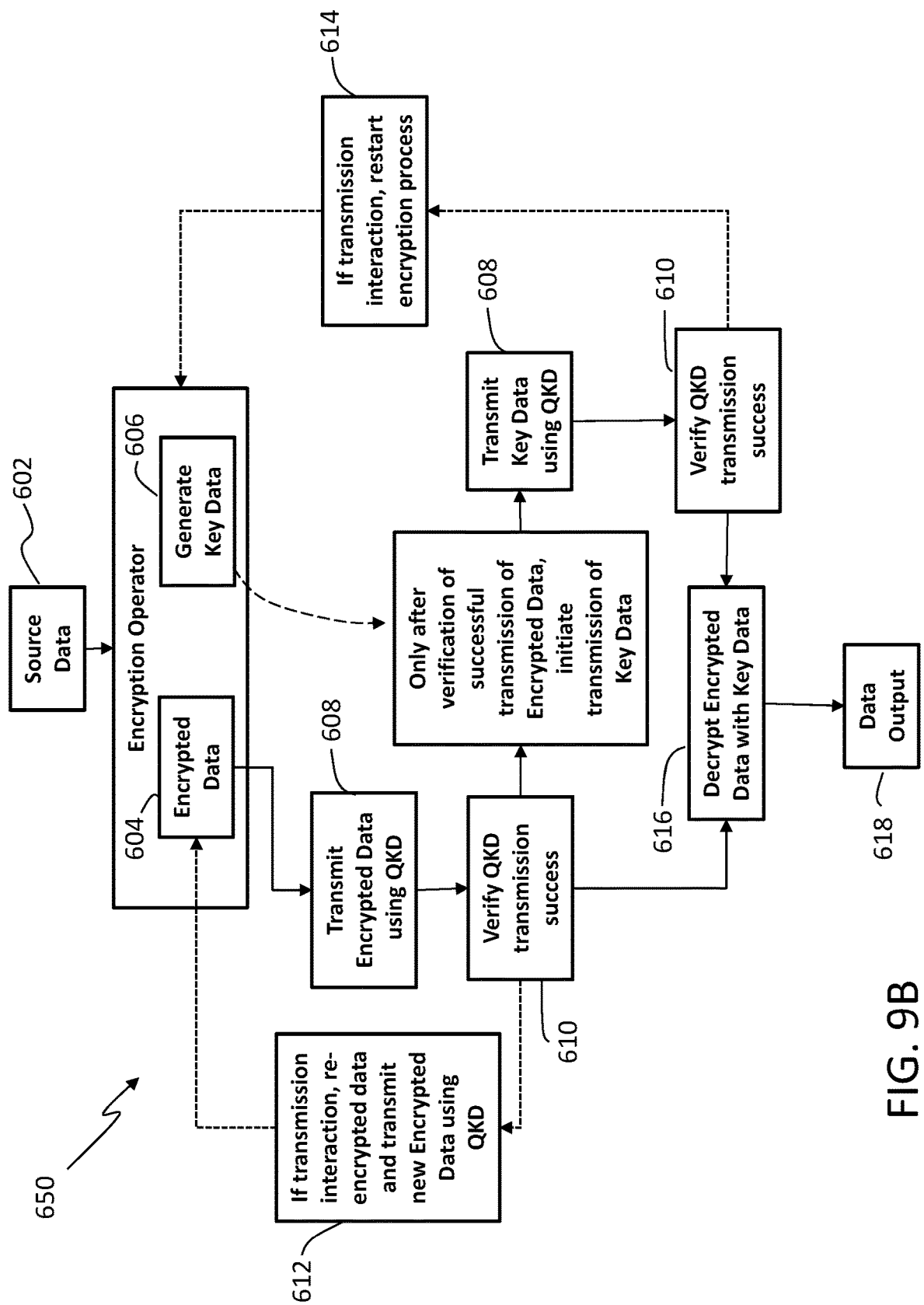
FIG. 9B depicts a flowchart 650 of highly secured encryption process for network communication using quantum technologies, in accordance with the second embodiment of the present invention.

FIG. 9B depicts a flowchart 650 of highly secured encryption process for network communication using quantum technologies, in accordance with the second embodiment of the present invention, where the encrypted data 604 is transmitted first and the key data 606 is withheld. As shown, a quantity of source data is provided at block 602. An encryption operator receives the source data and encrypts it to produce encrypted data 604. The encryption operator also produces key data 606 corresponding to the encrypted data 604. The encrypted data 604 is then transmitted through at least one network-enabled communication path between a first network location and a second network location, which may be any locations on a computerized network, such as the Internet, a WAN, a LAN, or another network. Transmission of the encrypted data 604 occurs using QKD, as shown at block 608, while the key data 606 is not transmitted. For example, the encrypted data 604 is first sent from the first network location to the second network location using QKD, while the key data 606 remains secure at the first network location. Only after the encrypted data 604 arrives at the second network location, the success of the transmission may be verified at 610. Verifying the success of the transmission uses QKD and determines whether the encrypted data 604 has been eavesdropped, listened to, viewed, or otherwise interacted with by an unauthorized third party.

If verification of the successful transmission of the encrypted data 604 is complete, then the key data 606 may be transmitted at block 608 along the network path. It is noted that the key data 606 is not sent until only after the encrypted data set 604 is verified to have successfully completed transmission. When the key data 606 arrives at the destination location of the network, the success of the transmission may be verified at 610. In the same manner as with the encrypted data 604, verifying the success of the transmission of the key data 606 uses QKD and determines whether the key data 606 has been eavesdropped, listened to, viewed, or otherwise interacted with by an unauthorized third party. If verification of the successful transmission of the key data 606 is complete, the encrypted data 604 and key data 606 may be recombined at block 616 to decrypt the encrypted data 604.

Figure 10:
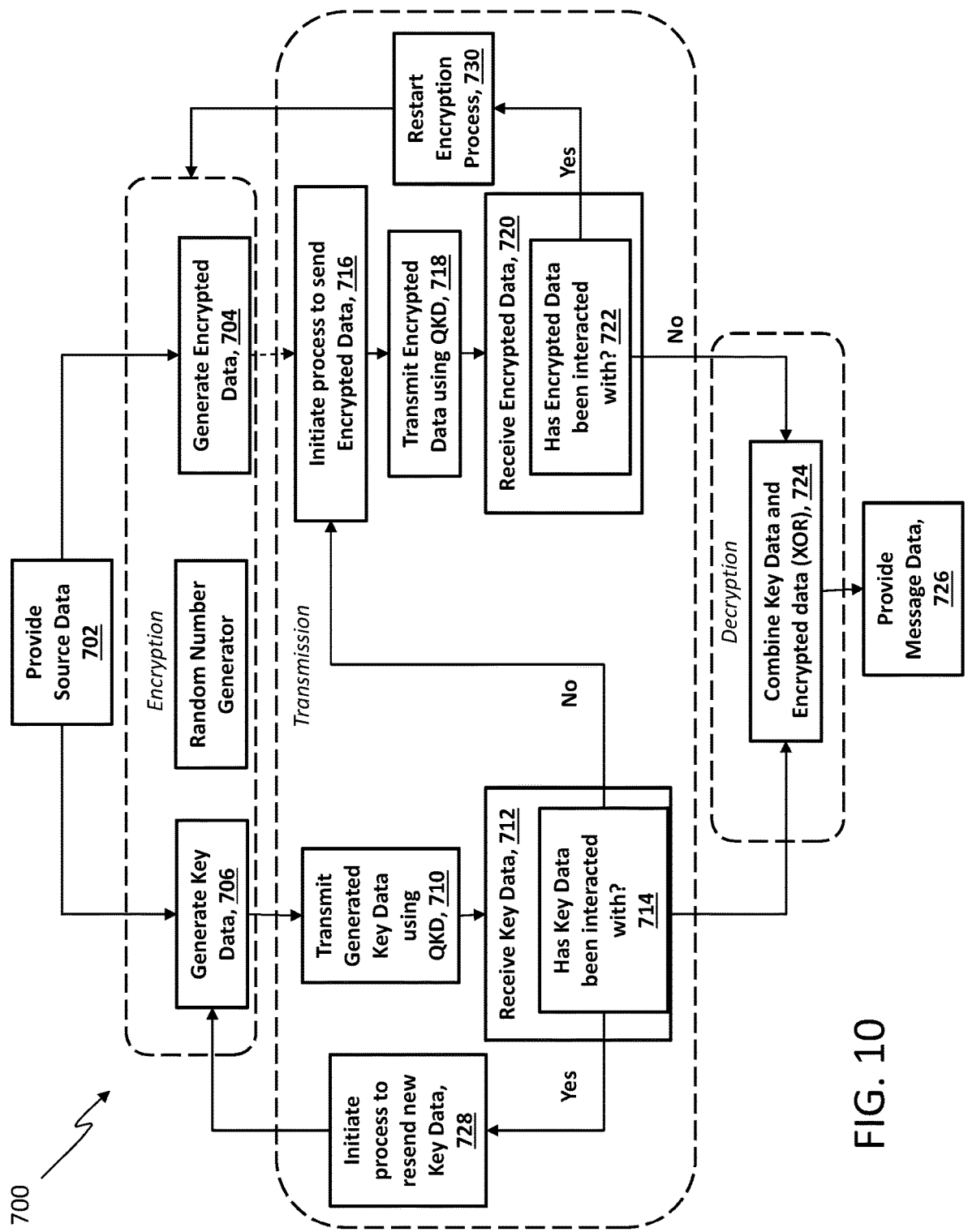
FIG. 10 depicts a detailed flowchart of highly secured encryption process for network communication using quantum technologies, in accordance with the second embodiment of the present invention.

FIG. 10 depicts a detailed flowchart 700 of highly secured encryption process for network communication using quantum technologies, in accordance with the second embodiment of the present invention. In particular, FIG. 10 depicts a detailed flowchart of the process generally described in FIGS. 9A-9B. As shown in FIG. 10, the encryption operator generates the encrypted data 704 and the key data 706. The encryption operator may produce the encrypted data 704 and key data 706 by a variety of methods. One in particular uses a random number generator to generate a random bit size corresponding to every write request of the source data of a size equal to the random bit size. It is then possible to generate a random key equal to or greater in size than the random bit size. The write request may include the use of a logical block number destination. Once the data is encrypted and the key data 706 and encrypted data 704 are produced, the key data may be transmitted using QKD as shown at block 710. The key data is received at block 712 where verification of whether the data has been interacted with is conducted at block 714.

If the transmission of the key data was successful and there is no detection of unauthorized interaction, then a process to transmit the encrypted data is initiated at block 716. Here, the encrypted data 704 is transmitted at block 718 using QKD and the transmitted data is received at block 720. Verification of whether the encrypted data has been interacted with is conducted at block 722. If the transmission of the encrypted data was successful and there is no detection of unauthorized interaction, then the encrypted data and the key data are processed in the decryption module where the key data and the encrypted data are combined with a decryption operator at block 724 to decrypt the source data. The resulting message data may then be output at block 726.

During the process described in FIGS. 9A-10, it is possible that the key data or the encrypted data may be interacted with during transmission, such that the data sets are eavesdropped on, listened to, viewed, or otherwise interacted with by an unauthorized third party. If interaction takes place, the verification of successful transmission will detect such interaction by detecting the anomalies within the data set caused by the unauthorized interaction's measurement of the data set. Thus, the verification modules (610 in FIGS. 9A-9B; 714, 722 in FIG. 10) can identify that the transmission of the data set was not secure. When this occurs, the transmitted data set is discarded and an instruction for retransmission of the data set is sent. For example, at block 612 in FIGS. 9A-9B or block 728 in FIG. 10, instructions to re-encrypt and retransmit the key data are sent. This instruction begins the process of resending the data set. It is noted that if the key data is determined to have been interacted with during transmission, retransmission of a new key data set is instructed, e.g., by instructing the encryption operator to re-encrypt the source data to produce new key data and new encrypted data. The process then repeats with transmitting this new key data, and the process continues until there is a verified successful transmission without unauthorized interaction.

Upon successful verification of transmission of the key data, the encrypted data may then be transmitted, and the success of that transmission is verified, e.g., at block 610 in FIGS. 9A-9B or in block 722 of FIG. 10. If there is evidence of an unauthorized interaction with the encrypted data, then the entire process begins again at the encryption operator with re-encrypting the source data with new key data and new encrypted data, as shown at block 614 in FIGS. 9A-9B and block 730 in FIG. 10. Any number of interactions of transmission, re-encryptions, and retransmission may occur until both the key data and the encrypted data are verified to have been successfully transmitted without unauthorized interaction. The verification module may operate in various methods to detect interaction. For example, it may be possible for any interaction of the data sets to be detected, such that the detection of any anomaly causes the data sets to be destroyed and for the re-encrypting and retransmission process to begin. In another example, it may be possible to detect the if the level of eavesdropping is below a certain threshold, and if not, the communication is aborted. It is noted that the transmission of the data sets may be adjusted to improve performance of the transmission. For example, the transmission of the encrypted data or the key data may be varied based on timing differences of failure rates of earlier transmission, which can aid in achieving a future successful transmission. One or more algorithms may be used to control varying the process of sending the data based on timing differences of transmission.

It is noted that the key data may commonly be the first data to be transmitted while the encrypted data has transmission delayed to a later point in time, e.g., until verification of successful transmission of the key data can be completed. However, it may be permissible in some situations for either data set to be the first in time to be transmitted. For example, as shown in FIG. 9B, the encrypted data may be transmitted first while the key data is delayed. In this example, it nay be possible to produce the data key after verification of successful transmission of the encrypted data, or if the encrypted data is interacted with by an unauthorized party, the key data is not generated and the communication is aborted. The specific priority of which data set is transmitted first or second may vary, depending on the design of the system. In the process of FIG. 10, the key data is disclosed as being transmitted first and the encrypted data is transmitted only after verification of successful transmission of the key data.

One of the benefits of the system and method disclosed herein is that even if unauthorized interaction with the data sets occurs, it is only possible for that interaction to occur with one of the data sets, not both. For example, if interaction with the key data occurs, that interaction is detectable and causes the encrypted data to not be transmitted. If, however, the key data is successfully transmitted but the encrypted data is found to have been interacted with by unauthorized parties, then both the encrypted data and the key data are destroyed and the source data is re-encrypted for the process to begin again. Moreover, since both data sets are encrypted during transmission, even if an unauthorized third party were to eavesdrop, access, or otherwise interact with one of the data sets, they would be unable to discern any intelligible data from the data set since it is fully encrypted. Indeed, anyone who does look at the data during transmission will learn nothing, since they only will be able to view encrypted key data or encrypted data, but not both, regardless of the number of times the data is viewed.

The method and system disclosed herein may further heighten security of the data transmission by encrypting it through use of a key which uses a number of bytes equal to or greater than the size of the data source. For example, encryption may use a random number generator which generates a random key or number equal to or greater in size than the random bit size. Then, a random bit size generator generates a random bit size corresponding with every write request of the data source of a size equal to the random bit size. With the increasing processing power of modern computers, and with the use of parallel computing architecture, encryption of the data may be completed in hardware within a very small period of time, such as encryption of 1 TB of data in a second. This allows for efficient scaling of encryption, such that the subject system and method can be utilized for larger data sources.

It is noted that the system and method disclosed herein may be utilized with a variety of different data types. For example, the data source may be a simplistic data set having a small size, or the data source may be a complex data set with a large size. The data source may also include blockchain data, such that the blockchain data can be transmitted securely through the system and method disclosed herein. In this way, the subject system and method effectively act as a tunnel to transmit blockchain data or ledgers therethrough.

Figure 11:
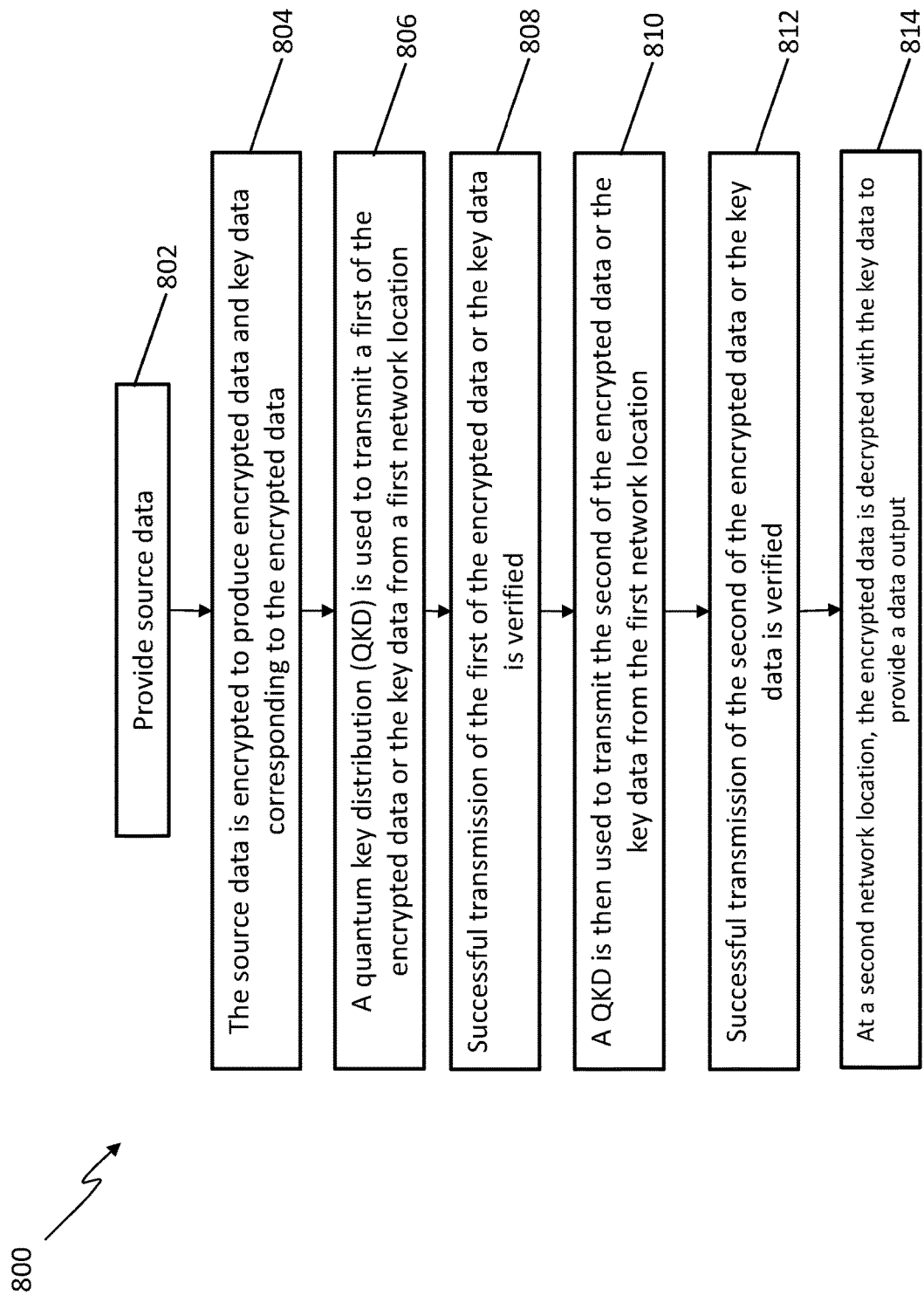
FIG. 11 is a flowchart of a method for secure network communications of data, in accordance with the second embodiment of the present invention.

FIG. 11 is a flowchart 800 of a method for secure network communications of data, in accordance with the second embodiment of the present invention. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 802, source data is provided. The source data is encrypted to produce encrypted data and key data corresponding to the encrypted data (block 804). A quantum key distribution (QKD) is used to transmit a first of the encrypted data or the key data from a first network location (block 806). Successful transmission of the first of the encrypted data or the key data is verified (block 808). A QKD is then used to transmit the second of the encrypted data or the key data from the first network location (block 810). Successful transmission of the second of the encrypted data or the key data is verified (block 812). At a second network location, the encrypted data is decrypted with the key data to provide a data output (block 814). Any number of additional steps, functions, processes, or variants thereof may be included in the method, including any disclosed relative to any other figure of this disclosure.

Figure 12:
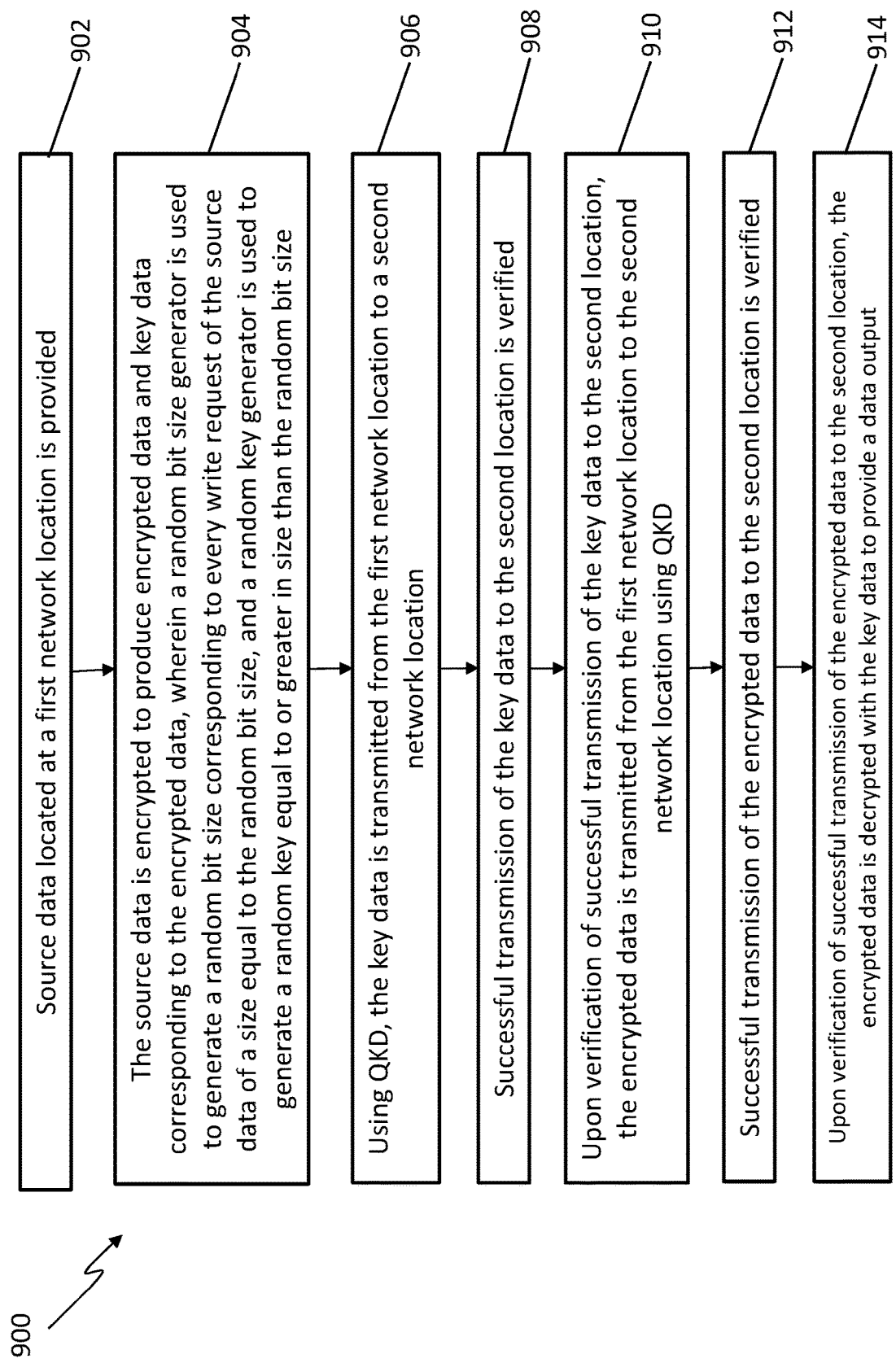
FIG. 12 is a flowchart of a method for secure network communications of data using quantum key distribution, in accordance with the second embodiment of the present invention.

FIG. 12 is a flowchart 900 of a method for secure network communications of data using quantum key distribution, in accordance with the second embodiment of the present invention. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As shown by block 902, source data located at a first network location is provided. The source data is encrypted to produce encrypted data and key data corresponding to the encrypted data, wherein a random bit size generator is used to generate a random bit size corresponding to every write request of the source data of a size equal to the random bit size, and a random key generator is used to generate a random key equal to or greater in size than the random bit size (block 904). Using QKD, the key data is transmitted from the first network location to a second network location (block 906). Successful transmission of the key data to the second location is verified (block 908). Upon verification of successful transmission of the key data to the second location, the encrypted data is transmitted from the first network location to the second network location using QKD (block 910). Successful transmission of the encrypted data to the second location is verified (block 912). Upon verification of successful transmission of the encrypted data to the second location, the encrypted data is decrypted with the key data to provide a data output (block 914). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for secure network communications of data, the method comprising:
    providing source data;
    encrypting, using a first computer processor, the source data to produce encrypted data and key data corresponding to the encrypted data, wherein encrypting the source data comprises: generating a random bit size corresponding to every write request of the source data of a size equal to the random bit size; and generating a random key equal to or greater in size than the random bit size;
    transmitting, from a first network location to a second network location, a first of the encrypted data or the key data;
    verifying successful transmission of the first of the encrypted data or the key data;
    transmitting, from the first network location to the second network location, a second of the encrypted data or the key data only after verifying successful transmission of the first of the encrypted data or the key data from the first network location to the second network location;
    verifying successful transmission of the second of the encrypted data or the key data; and
    decrypting, using a second computer processor at the second network location, the encrypted data with the key data to provide a data output.

2. The method of claim 1, wherein verifying successful transmission of the encrypted data or the key data comprises detecting eavesdropping.

3. The method of claim 2, wherein upon detection of eavesdropping, one or both of the encrypted data or the key data is retransmitted using quantum key distribution (QKD).

4. The method of claim 1, wherein verifying successful transmission of the first of the encrypted data or the key data occurs at an earlier point in time than transmission the second of the encrypted data or the key data.

5. The method of claim 1, wherein quantum key distribution is used for transmitting at least one of the encrypted data or the key data.

6. The method of claim 1, further comprising varying the transmission of the encrypted data or the key data based on timing differences of failure rates of transmission.

7. A computerized system for secure network communication of data comprising:
    source data;
    an encryption operator, implemented on a first computer processor, receiving the source data and producing encrypted data and key data corresponding to the encrypted data, wherein producing encrypted data and key data comprises: generating a random bit size corresponding to every write request of the source data of a size equal to the random bit size; and generating a random key equal to or greater in size than the random bit size;
    at least one network-enabled communication path between a first network location and a second network location, wherein a first of the encrypted data or the key data is transmitted from the first network location to the second network location;
    at least one verification operator verifying successful transmission of the first of the encrypted data or the key data through the network-enabled communication path;
    a second of the encrypted data or the key data transmitted from the first network location to the second network location only after verifying successful transmission of the first of the encrypted data or the key data, the at least one verification operator verifying successful transmission of the second of the encrypted data or the key data through the network-enabled communication path; and
    a decryption operator, implemented on a second computer processor, decrypting, at the second network location, the encrypted data with the key data to provide a data output.

8. The system of claim 7, wherein the write request further comprises the use of a logical block number destination.

9. The system of claim 7, wherein verifying successful transmission of the encrypted data or the key data comprises detecting eavesdropping.

10. The system of claim 9, wherein upon detection of eavesdropping, one or both of the encrypted data or the key data is retransmitted using quantum key distribution (QKD).

11. The system, of claim 7, wherein verifying successful transmission of the first of the encrypted data or the key data occurs at an earlier point in time than transmission of the second of the encrypted data or the key data.

12. The system of claim 7, wherein quantum key distribution is used for transmitting at least one of the encrypted data or the key data.

13. The system of claim 7, further comprising varying the transmission of the encrypted data or the key data based on timing differences of failure rates of transmission.

14. The system of claim 7, wherein the encryption operator further comprises an XOR operation.

15. A computerized method for secure network communications of data, the method comprising:

providing source data located at a first network location;
encrypting, using a first computer processor, the source data to produce encrypted data and key data corresponding to the encrypted data, wherein a random bit size generator is used to generate a random bit size corresponding to every write request of the source data of a size equal to the random bit size, and a random key generator is used to generate a random key equal to or greater in size than the random bit size;
transmitting the key data from the first network location to a second network location;
verifying successful transmission of the key data to the second location;
upon verification of successful transmission of the key data to the second location, transmitting the encrypted data from the first network location to the second network location only after verifying successful transmission of the first of the encrypted data or the key data;
verifying successful transmission of the encrypted data to the second location; and
upon verification of successful transmission of the encrypted data to the second location, decrypting, using a second computer processor, the encrypted data with the key data to provide a data output.

16. The method of claim 15, wherein verifying successful transmission of the key data or the encrypted data comprises detecting a level of eavesdropping at or below a predetermined threshold.

17. The method of claim 15, wherein quantum key distribution is used for transmitting at least one of the encrypted data or the key data.

18. The method of claim 15, wherein decrypting the encrypted data with the key data comprises:
receiving the encrypted data and key data;
receiving logical block number (LBN) destination associated with the source data and an integer associated with a number of bytes of the source data;
identifying the number of bytes of encrypted data;
identifying the same number of bytes of key data; and
initiating an operation to combine the encrypted data with the key data to reconstruct the source data.

* * * * *